UNITED STATES PATENT OFFICE.

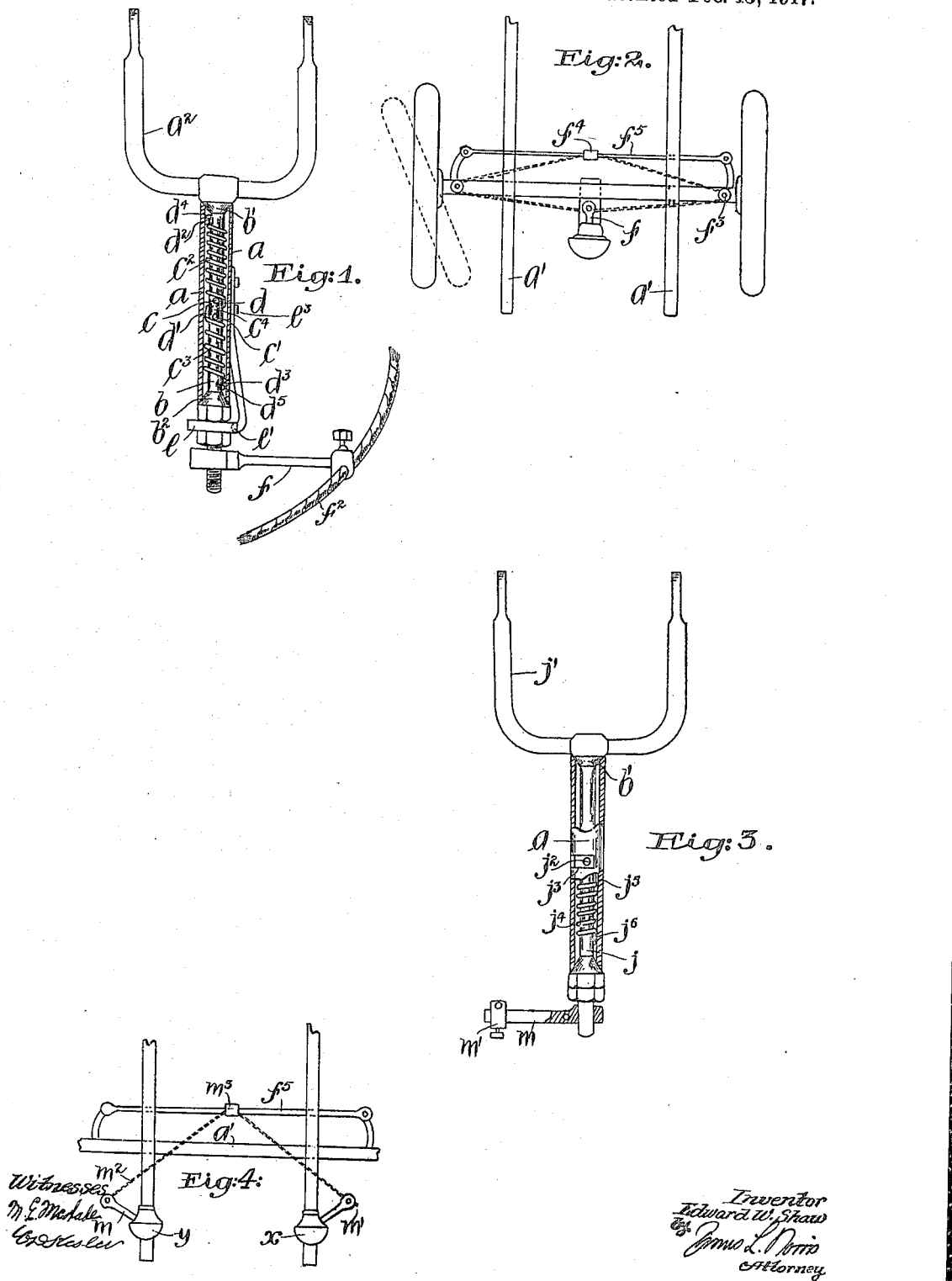

EDWARD WORSTER SHAW, OF KALGOORLIE, WESTERN AUSTRALIA, AUSTRALIA.

SWIVEL HEAD-LAMP FOR MOTOR-CARS.

1,216,173.  Specification of Letters Patent.  Patented Feb. 13, 1917.

Application filed September 18, 1915. Serial No. 51,420.

*To all whom it may concern:*

Be it known that I, EDWARD WORSTER SHAW, a subject of the King of Great Britain, and residing at Kalgoorlie, Western Australia, Commonwealth of Australia, have invented certain new and useful Improvements in Swivel Head-Lamps for Motor-Cars, of which the following is a specification.

The object of this invention is to provide means whereby the head-lamps of motor cars and such vehicles will be operated to swivel or move in order to overcome the present troubles arising from the use of fixed lamps, especially when the car is making turns in roads or streets. It is contemplated by the present invention to so construct head-lamps that may be turned to direct their light in the direction of travel of the car.

The present invention comprises a swivel or pivoted means whereby companion head-lamps, or one single lamp, as the case may be, are adapted to be automatically controlled in unison by and with the steering gear of the vehicle. The invention further comprises a certain novel construction and arrangement of parts which will be hereafter more fully described and finally pointed out in the appended claims.

In the accompanying drawings which form part of the specification—

Figure 1 is an elevation in section showing the swivel or pivoted means for use with a single head-lamp and capable of being turned to either side by the steering gear of the vehicle.

Fig. 2 is a plan view showing an operative connection between the lamp and said steering gear and through which a single lamp is controlled.

Fig. 3 is a view similar to Fig. 1 but illustrating a structural modification of the said pivoted means for use with companion head-lamps and adapted to be operated by the steering gear.

Fig. 4 is a plan view showing a connection between companion head-lamps and the steering gear whereby the movement of said lamp is controlled.

Referring to Fig. 1, $a$ indicates a tubular standard secured conveniently on the body of the car $a^1$ and pivotally supporting a forked lamp bracket $a^2$ provided with a depending stem $b$. The standard $a$ is suitably formed at its opposite end to receive the cones $b^1$ and $b^2$. The upper cone $b^1$ is formed integral with the bracket $a^2$ while the lower cone $b^3$ is threaded on the lower portion of the stem $b$. The cone $b^2$ is removable from the stem $b$, thereby permitting the various parts to be assembled and connected in a manner which will be understood. The cone $b^2$ has a portion thereof preferably formed with flat faces adapted to be engaged by a tool so as to effect the adjustment thereof. However, I do not limit myself to the exact construction of the cone.

The coil springs $c^2$ and $c^3$ surround the stem $b$ and are arranged one above the other, the inner ends of which engage with the pins $c$ and $c'$, respectively, projecting from the stem $b$ and which permanently engage with said pins, which latter tend to hold the springs in their respective positions. The inwardly projecting pins $d^2$ and $d^3$ provided on the standard $a$ alternately engage with the respective outer terminals $d^4$ and $d^5$ of the springs $c^2$ and $c^3$, according to the direction of rotation of the stem $b$. A stop pin $c^4$, centrally arranged between the pins $c$ and $c'$, projects inwardly from the standard $a$ and is adapted to alternately engage with the inner ends $d$ and $d'$ of said springs, the springs $c^2$ and $c^3$ are each adapted to be wound up or tensioned upon said stem by the alternate rotation of the latter. It will thus be understood that when the bracket $a^2$ is turned in one direction one of the springs will be tensioned upon the stem $b$ between its respective terminal pins, which tensioning of the spring will cause the latter to rotate the stem $b$ and return the bracket $a^2$ to its normal centered position.

A disk $e$ is rigidly carried on the stem $b$, preferably below the cone $b^2$ and is formed with a notch $e'$ which is engaged by a spring pawl $e^2$, said pawl being suitably secured at $e^3$ to the standard $a$, as shown. The purpose of the pawl and disk is to lock the lamp bracket $a^2$ in its normal centered position after being returned thereto by either of the springs $c^2$ and $c^3$ in the manner just described.

An arm $f$ projects from the lower end of the stem $b$ and has its outer end connected with a cable $f^2$ through the medium of a suitable adjustment clamp. The cable $f^2$ passes from the clamp $f^4$ around the guide wheels $f^3$ and is secured to the clamp $f^4$ at a central point on the coupling rod $f^5$ of the steering gear of the vehicle, as will be seen from Fig. 2, and then returns to and is secured to the arm $f$ as shown.

The modification disclosed in Figs. 3 and 4 shows the use of the invention with companion head-lamps $x$ and $y$. At a central point of the stem $j$ depending from the forked lamp bracket $j'$ projects a small pin $j^2$ which engages in an inclined and coinciding slot $j^3$ formed in the standard $a$. By means of said slot and pin $j^2$, the stem $j$ is limited in its radial movement to a predetermined degree. The stem $j$ is surrounded by a coil spring $j^4$ which is capable of being wound to place it under tension in a similar manner as just described in connection with the showing of Fig. 1, the spring $j^4$ having one end engaging with the pin $j^5$ projecting from the stem $j$ and its other end adapted to engage with the pin $j^6$ projecting from the standard $a$. With this form of the invention, which is used with companion head-lamps, a standard $a$ is disposed upon and secured to opposite sides of the body of the car, as shown in Fig. 5, and the stem $j$ of each standard has projecting therefrom an arm $m$ having connection with a cable $m^2$ through the adjustment clamps $m'$ carried by said arms $m$. The cable $m^2$ is secured at an intermediate point, preferably to a central point, of the coupling rod $f^5$ of the steering gear of the vehicle.

The companion lamps $x$ and $y$ are adapted to move independently of each other, as, for instance, when the car turns to the right, the lamp on the right-hand side of the car will be turned to the right by the shifting of the coupling rod $f^2$ of the steering gear, which movement is transmitted from the cable $m^2$ to the stem $j$. The spring $j^4$ surrounding said stem is so arranged that it will be tensioned by such movement and when the steering gear is again straightened out will return the lamp $y$ to its normally centered position. During this operation of the right-hand lamp, the left-hand lamp will remain stationary. However, a similar operation of the left-hand lamp will take place when the steering gear of the vehicle is shifted to the left.

The operation of the showing in Fig. 1 is as follows: Assuming that the car is being turned to the right, the consequent movement of the steering gear coupling rod $f^5$ causes the central or single lamp $a^2$ to be turned to the right since the right-hand side portion of the cable $f^2$ becomes taut while the left-hand side portion of the cable correspondingly becomes slack. A similar but converse operation takes place when the lamp is turned to the left. As soon as the car assumes a straight course, the cable releases its pull and allows the spring $c^2$ or $c^3$, which has been wound up, to relax and cause the lamp to return to its normal position.

What I claim as my invention and desire to secure by Letters Patent is—

1. In dirigible head-lamps for vehicles, comprising a tubular standard secured to the vehicle, a shaft disposed in said standard, cone-shaped bearings on said shaft and adapted to engage with the ends of said hollow standard for rotatably securing the shaft in position relative to the standard, one of said bearings being removable and adjustable on said shaft, a lamp bracket carried by one end of said shaft and rotatable therewith, spring means disposed in said standard and surrounding said shaft for rotating the same to its normal position when said spring means is tensioned, and means connected to the other end of the shaft for turning the latter and tensioning said spring means.

2. A dirigible head-lamp for vehicles, comprising a tubular standard secured to the vehicle, a shaft disposed in said standard, cone-shaped bearings on said shaft and adapted to engage with the ends of said hollow standard for rotatably securing the shaft in position relative to the standard, one of said bearings being removable and adjustable on said shaft, a lamp bracket carried by one end of said shaft and rotatable therewith, spring means within said standard and surrounding said shaft for rotating the same to its normal position when said spring means is tensioned, means connected to the other end of the shaft for turning the latter and tensioning said spring means, a disk rigid on said shaft and having a notch therein, and a spring detent secured to said standard and adapted to engage in said notch to yieldingly hold the shaft in its normal position.

In testimony whereof I have hereunto set my hand in presence of two subscribing witnesses.

EDWARD WORSTER SHAW.

Witnesses:
REGINALD F. COOK,
W. H. HORTEN.